United States Patent [19]

Najjar et al.

[11] Patent Number: 5,358,553
[45] Date of Patent: Oct. 25, 1994

[54] MEMBRANE AND SEPARATION PROCESS

[75] Inventors: Mitri S. Najjar; Tansukhlal G. Dorawala, both of Wappingers Falls; Uygur Koturk, Poughkeepsie, all of N.Y.

[73] Assignee: Texaco Inc., White Plains, N.Y.

[21] Appl. No.: 726,434

[22] Filed: Jul. 5, 1991

[51] Int. Cl.$^5$ .............. B01D 53/22; B01D 69/04; B01D 71/02; C25D 13/00
[52] U.S. Cl. .............................. 96/11; 55/524; 55/DIG. 5; 95/50; 95/56; 204/181.7; 205/231
[58] Field of Search ............ 55/16, 158, 524, DIG. 5; 204/181.7; 205/231; 96/11; 95/50, 56

[56] References Cited

U.S. PATENT DOCUMENTS

| | | | |
|---|---|---|---|
| 1,174,631 | 3/1916 | Snelling | 55/158 |
| 2,597,907 | 5/1952 | Steiner et al. | 55/158 |
| 2,734,592 | 2/1956 | Jones | 55/158 |
| 2,958,391 | 11/1960 | De Rosset | 55/16 |
| 3,172,742 | 3/1965 | Rubin | 55/158 |
| 3,232,026 | 2/1966 | McKinley | 55/16 |
| 3,238,700 | 3/1966 | Cohn | 55/16 |
| 3,241,293 | 3/1966 | Pfefferle | 55/158 |
| 3,344,586 | 10/1967 | Langley et al. | 55/158 |
| 3,428,476 | 2/1969 | Langley et al. | 55/16 |
| 4,167,457 | 9/1979 | Giner | 204/153.1 |
| 4,699,637 | 10/1987 | Iniotakis et al. | 55/16 |
| 4,810,594 | 3/1989 | Bregoli et al. | 429/42 |
| 4,915,984 | 4/1990 | Murakami | 423/448 |
| 5,104,425 | 4/1992 | Rao et al. | 55/16 |
| 5,181,941 | 1/1993 | Najjar et al. | 55/16 |

FOREIGN PATENT DOCUMENTS 376235  7/1990  European Pat. Off. ............. 55/158

Primary Examiner—Wayne Langel

[57] ABSTRACT

Mixtures of hydrogen and hydrocarbons may be separated by a membrane formed of a thin dense layer of platinum or palladium on the inside of a porous graphite tube.

15 Claims, No Drawings

MEMBRANE AND SEPARATION PROCESS

FIELD OF THE INVENTION

This invention relates to a novel membrane. More particularly it relates to a membrane system which may be used to separate gases.

BACKGROUND OF THE INVENTION

As is well known to those skilled in the art, it may be desirable or necessary to separate various components from the streams which they are found in commercial operations. In the field of gas technology for example, it may be desirable to effect a separation between hydrogen and hydrocarbon gases in order to obtain one or the other, or both, in enriched or purified state. Prior art techniques to effect this separation include distillation—but distillation is characterized by high initial capital costs and substantial operating costs.

It is an object of this invention to provide a novel membrane system particularly characterized by its ability to separate gas streams into their components. Other objects will be apparent to those skilled in the art from the following.

STATEMENT OF THE INVENTION

In accordance with certain of its aspects, this invention is directed to a method which comprises
  maintaining at 500° C.–1300° C. an inert molten salt bath containing a halide of an alkali metal or an alkaline earth metal;
  maintaining in said inert molten salt bath a porous graphite cathode and an anode and a source of Group VIII noble metal;
  passing a direct current through said cathode, and said bath, and said anode at cathode current density of 0.1–4 asd thereby depositing on said cathode a thin, dense membrane layer of Group VIII noble metal; and
  recovering said cathode bearing a thin, dense membrane layer of Group VIII noble metal.

In accordance with certain of its other aspects, this invention is directed to a membrane system, characterized by its ability to separate hydrogen from hydrocarbon gases, which comprises a porous graphite support including a surface portion thereof bearing as an integral portion within the pores thereof a composition of carbon and a Group VIII noble metal.

DESCRIPTION OF THE INVENTION

In accordance with practice of this invention, the membrane of this invention may be formed on a porous graphite body or support. The configuration or shape of the porous graphite body will depend on the form of the structure in which the membrane assembly is to be used. Although it is possible to utilize a porous graphite body in the form of a flat sheet, it is found to be more desirable to utilize a tubular configuration. The inside diameter of the tubular body may typically be 3–50 mm, say 7 mm. The outside diameter is typically 5–52 mm, say 9 mm. It is found to be convenient to utilize tubular members having a length of 25 cm–200 cm, say 120 cm.

The porosity of these porous graphite tubular bodies may be 30–70%, say 50%, as determined by mercury porosimetry techniques.

Preparation of the membrane system of this invention may be effected by electrodeposition onto the porous graphite body support from a molten salt bath. The bath may be formed of any salt having a melting point of 500° C.–1300° C. (but not higher than the melting point of the Group VIII noble metal or alloy thereof to be deposited). The preferred components of the bath include salts of alkali metals.

Alkali metals which may be employed may include sodium, potassium, rubidium, cesium, or lithium. These metals may be employed as the halide e.g. fluoride, chloride, bromide, or iodide. It is preferred to utilize alkali metals as their fluorides; and the preferred alkali metal halide may be lithium fluoride or sodium fluoride. It is more preferred to employ a mixture of halides typified by the eutectic composition of 61 mole % lithium fluoride and 39 mole % sodium fluoride. This eutectic has a melting point of 649° C. at atmospheric pressure.

Alternatively the molten salt bath may contain an alkaline earth metal halide. The alkaline earth metals which may be employed may include calcium, barium, strontium, or magnesium. Preferred component is calcium fluoride. It may be possible to employ alkaline earth halides as mixtures thereof or with the alkali metal halides.

Preferably the mixture of salts will be such that the melting point of the mixture is within the preferred operating range of 500° C.–1300° C., say 600° C.–800° C., preferably 649° C. Illustrative mixtures which may be employed may include the following:

TABLE

| | Components | Mole % | Mixture Melting Point °C. |
|---|---|---|---|
| A | LiF | 61 | 649 |
| | NaF | 39 | |
| B | LiF | 52 | 510 |
| | KF | 48 | |
| C | $CaCl_2$ | 60 | 597 |
| | $BaCl_2$ | 40 | |
| D | KF | 80 | 780 |
| | $CaF_2$ | 20 | |
| E | LiF | 50 | 621 |
| | $BaF_2$ | 35 | |
| | NaF | 15 | |

The preferred bath composition is the first listed in the above Table.

Although it is possible to operate using an insoluble anode such as carbon or steel (in which case the source of the Group VIII noble metal may be a bath soluble salt, preferably a halide, of Group VIII noble metal such as platinum or palladium), it is preferable to utilize a soluble anode of the Group VIII noble metal, preferably platinum or palladium. When it is desired to deposit an alloy, at least one (and preferably both) of the alloy components may be present in the bath as soluble salts. Typical of such salts may be:

TABLE

| |
|---|
| $PtF_2$ |
| $PtF_4$ |
| $PtCl_2$ |
| $PtCl_3$ |
| $PdCl_2$ |

If it be desired to deposit an alloy, the bath may contain salts or other metals typified by Cr, Cu, Ni, Rh, etc—in addition to Pd or Pt. An alloy of Pd-Pt may be deposited.

In practice of the process of the invention, a direct current of electricity is passed through the cathode, the bath, and the anode. Typically the potential across the bath may be 0.1–2.0 volts, preferably 0.2–1.0 volts, say 0.1 volts. The cathode current density may be 0.1–4.0, preferably 0.2–1.0, say 0.3 amperes per square decimeter (asd). Electrodeposition for 0.05–120 minutes, typically 10–30 minutes may yield an electrodeposit of palladium which has a thickness of 0.05–200 microns, preferably 0.2–50 microns, say 15 microns.

Although it may be possible to electrodeposit the thin, dense layer of Group VIII noble metal, preferably palladium or platinum on the outside of the preferred tubular graphite cathode, it is preferred to electrodeposit the thin dense layer onto the inside surface. This may be carried out using a metal wire anode within the tubular cathode—as this will minimize problems arising from inadequate throwing power of the bath which might be observed if the anode were located outside the tubular cathode. In the case of a flat cathode, as in the case of the tubular cathode, it may be possible to effect electrodeposition on both sides of the cathode—but this is not necessary when the system is to be used as a separation membrane.

The electrodeposited layer, after cooling to ambient temperature of 20° C.–80° C., say 40° C. is preferably contacted with water or an aqueous salt (e.g. sodium chloride) solution to dissolve therefrom any salts carried over from the bath.

It is a feature of the process of this invention that the thin electrodeposit of Group VIII noble metal, preferably of platinum or palladium (or alloy thereof) is dense and non-porous.

Typically the plated tubular product may be a tube of a porous graphite body of 5–52 mm, say 9 mm outside diameter, 3–50 mm, say 7 mm inside diameter and 25–200 cm, say 120 cm in length bearing on the inside surface a 0.05–10 micron, say 0.2 micron thin, dense platinum or palladium layer having a thickness of 0.2–50 microns, say 15 microns.

It will be found that the deposited metal diffuses into the porous substrate to form an alloy or solid solution therewith; and it becomes an integral part thereof rather than being only mechanically attached to the surface as may be the case with many electrodeposits. Observation reveals a sub-surface layer of carbon-metal on which may be found a layer of metal.

It is a feature of the process of this invention that there may be electrodeposited on top of the thin dense membrane layer of the Group VIII noble metal, preferably platinum or palladium, a layer of a platinum or a palladium alloy. The alloy may be e.g. palladium and a metal of Group I B (e.g. Cu, Ag, Au), II B (Zn or Cd preferably), IVA, (Sn preferably), VI B (Cr, Mo, W), or VIII (Fe, Co, Ni, Ru, Rh, Os, Ir, or Pt).

Illustrative of such alloys of palladium may be those containing the following metals in the indicated percentages: 2–50 w % Cr, 30–45 w % Cu, 3–15 w % Ni, 5–20 w % Rh, 5–15 w % Ru, 4–30 w % Pt, 2–65 w % Ag, 1–20 w % Sn etc. These alloys may be deposited onto the first deposit from a bath at conditions similar to those employed in the first electrodeposition operation.

In accordance with certain of its aspects, this invention is directed to a method of separating hydrogen from a charge gaseous mixture containing hydrogen and a gaseous hydrocarbon which comprises passing a charge gaseous mixture containing hydrogen and a gaseous hydrocarbon into contact with a thin, dense separating membrane layer containing Group VIII noble metal on a porous graphite body;

maintaining a pressure drop across said thin, dense separating membrane layer containing Group VIII noble metal on a porous graphite body thereby forming a retentate containing a decreased content of hydrogen and a permeate containing an increased content of hydrogen;

recovering said retentate containing a decreased content of hydrogen from the high pressure side of said thin, dense separating membrane layer containing Group VIII noble metal on a porous graphite body; and recovering said permeate containing an increased content of hydrogen from the low pressure side of said thin dense separating membrane layer containing Group VIII noble metal on a porous graphite body.

In practice of the process of this invention, the charge stream may be a gaseous mixture containing hydrogen and a gaseous hydrocarbon. Typically the hydrocarbon may be a $C_1$-$C_4$ hydrocarbon—methane, ethane, n-propane, n-butane, or iso-butane. Commonly the charge may contain 20–80, say 78 v % hydrogen and 20–80 say 22 v % hydrocarbon. Typical charge mixtures may be as follows:

TABLE

| Component | V % Broad | V % Typical |
| --- | --- | --- |
| Hydrogen | 20–70 | 78 |
| Methane | 5–20 | 10 |
| Ethane | 4–15 | 7 |
| Propane | 1–5 | 2 |
| Butane | 1–5 | 2 |
| i-butane | 0–4 | 1 |

Other hydrocarbons may also be present—typified by olefins, aromatics, naphthenes, etc.

The charge gas may be a stream from a dehydrogenation (or a hydrogenation) unit wherein it is desired to recover products or to shift the equilibrium during dehydrogenation or hydrogenation.

The charge hydrocarbon typically at 200°–600° C., say 447° C. and 200–1500 psi, say 1000 psig is passed into contact with the thin, dense separating membrane layer which preferably has been deposited on the inside of a porous graphite tubular conduit. Preferably the charge passes through the conduit at a flow rate of between 300–900 $cm^3$/min per square cm of surface, say 550 $cm^3$/min per square cm of surface.

As the charge passes through the tubular conduit, a portion of the charge diffuses through the metal layer and the graphite conduit. The permeate is found to contain an increased content of hydrogen—and the retentate contains a decreased content of hydrogen. Typically it may be possible to treat a charge containing 20–90 v %, say 78 v % hydrogen (plus hydrocarbon) and to attain a permeate containing 90–100 v %, say 99.9 v % hydrogen. The retentate within the tubular member may typically contain 20–30 v %, say 25 v % hydrogen.

In practice of the invention, a plurality of tubes may be preferably formed in a heat-exchanger-like structure, and the charge is admitted to and passes through the tube side from which the retentate is also withdrawn. The hydrogen-enriched permeate is withdrawn through the shell side. It will be apparent to those skilled in the art that greater degrees of concentration (e.g. purity of hydrogen) may be attained by passing the permeate through additional stages.

DESCRIPTION OF SPECIFIC EMBODIMENTS

Practice of the process of this invention will be apparent to those skilled in the art from the following wherein as elsewhere in this specification, all parts are parts by weight unless otherwise stated.

EXAMPLE I

In this Example which represents the best mode presently known of preparing the separating membrane, there is prepared a bath containing:

| Component | w % |
| --- | --- |
| lithium fluoride | 61 |
| sodium fluoride | 39 |

The mixture of lithium fluoride and sodium fluoride is the eutectic mixture melting at about 649° C.

The bath is heated to 820±20° C. and there is submerged therein a tubular cathode (i.d. 7 mm, o.d. 9 mm, and 150 cm in length) of porous graphite. A palladium anode wire is mounted within the tubular cathode; and current of 440±40 millivolts is passed between the cathode and the bath and the anode, at a cathode current density of 0.1 amps per square decimeter.

After 10 minutes, there is deposited on the inside of the tubular cathode a thin, dense layer of palladium, of thickness of 15 microns on an interface of palladium—carbon of thickness of 0.05 microns.

EXAMPLE II

In this Example which represents the best mode presently known of separating hydrogen by practice of the process of this invention, the charge is:

TABLE

| Component | Vol % |
| --- | --- |
| Hydrogen | 78 |
| Methane | 22 |

This charge at 447° C. and 1000 psig is admitted to the tube side of an heat-exchanger-like structure containing 19 tubes prepared in accordance with Example I. The total membrane area is 0.11 m².

After steady state is reached, it may be found that the permeate is as follows:

TABLE

| Component | V % |
| --- | --- |
| Hydrogen | 100% |
| Methane | 0% |

The retentate may be characterized as follows:

TABLE

| Component | V % |
| --- | --- |
| Hydrogen | 25% |
| Methane | 75% |

The selectivity is found to be 100% and the permeability is $5.8 \times 10^3$ cm³/cm². sec.

EXAMPLES III-VI

Results comparable to those of Example I may be attained if the metal layer is:

| Example | Metal Layer |
| --- | --- |
| III | Pd-Pt |
| IV | Pd-Cr |
| V | Pd-Cu |
| VI | Ir |

Although this invention has been illustrated by reference to specific embodiments, it will be apparent to those skilled in the art that various charges and modifications may be made which clearly fall within the scope of the invention.

What is claimed:

1. The method which comprises
    maintaining at 500° C.–1300° C. a molten salt bath containing a halide of an alkali metal or an alkaline earth metal;
    maintaining in said molten salt bath a porous graphite cathode and an anode and a source of Group VIII noble metal;
    passing a direct current through said cathode, said bath, and said anode at cathode current density of 0.1–4.0 asd thereby depositing on said cathode a thin, dense membrane layer of Group VIII noble metal; and
    recovering said cathode bearing a thin, dense membrane layer of Group VIII noble metal.

2. The method claimed in claim 1 wherein said molten salt bath contains an alkali metal halide.

3. The method claimed in claim 1 wherein said molten salt bath contains a plurality of alkali metal halides.

4. The method claimed in claim 1 wherein said molten salt bath contains an alkali metal fluoride.

5. The method claimed in claim 1 wherein said molten salt bath contains lithium fluoride and sodium fluoride or potassium fluoride.

6. The method claimed in claim 1 wherein said molten salt bath contains the eutectic of lithium fluoride and sodium fluoride.

7. The method claimed in claim 1 wherein said molten salt bath contains an alkaline earth metal halide.

8. The method claimed in claim 1 wherein said Group VIII noble metal is platinum.

9. The method claimed in claim 1 wherein said molten salt bath contains a bath-soluble halide of platinum or palladium as a source of Group VIII noble metal.

10. The method claimed in claim 1 wherein said anode is a source of Group VIII noble metal.

11. The method of claim 9 including the steps of electrodepositing on top of the thin, dense membrane layer of platinum or palladium a layer of platinum or palladium alloy.

12. The method which comprises
    maintaining at 600° C.–800° C. a molten salt bath containing a eutectic salt composition of lithium fluoride and sodium fluoride;
    maintaining in said molten salt bath a tubular graphite cathode and therewithin a palladium wire anode;
    passing a direct current through said cathode, said bath and said anode at cathode current density of 0.1–4.0 asd thereby depositing on the inside of said tubular graphite cathode a thin, dense membrane layer of palladium; and
    recovering said cathode bearing a thin, dense membrane layer of palladium metal.

13. A separating structure, characterized by its ability to separate hydrogen from mixtures thereof with hydrocarbons, which comprises a porous graphite body bearing on a surface thereof a thin dense electrodeposited membrane of a Group VIII noble metal prepared by the method which comprises maintaining at 500° C.–1300° C. a molten salt bath containing a halide of an alkali metal or an alkaline earth metal;

maintaining in said molten salt bath a porous graphite cathode and an anode and a source of Group VIII noble metal;

passing a direct current through said cathode, said bath, and said anode at cathode current density of 0.1–4.0 asd thereby depositing on said cathode a thin, dense membrane of layer of Group VIII noble metal; and recovering said cathode bearing a thin, dense electrodeposited membrane layer of Group VIII noble metal.

14. A separating structure as claimed in claim 13 wherein said separating structure comprises a porous tubular graphite body bearing on the inside surface thereof a thin dense layer of palladium or platinum.

15. A separating structure as claimed in claim 14 wherein said thin dense layer of palladium bears thereon a layer of a palladium alloy.

* * * * *